United States Patent [19]

Thomas et al.

[11] Patent Number: 4,787,831
[45] Date of Patent: Nov. 29, 1988

[54] DUAL SEAL SYSTEM FOR ROOTS BLOWER

[75] Inventors: Edmund P. Thomas, Bethlehem; John H. Muir, Kunkletown; Bruce C. Hargus, Slatington, all of Pa.

[73] Assignee: Air Products and Chemicals, Inc., Allentown, Pa.

[21] Appl. No.: 534,044

[22] Filed: Sep. 20, 1983

[51] Int. Cl.⁴ ............................................ F04C 27/00
[52] U.S. Cl. ...................................... 418/104; 277/3; 277/65; 277/93 S D; 277/174; 277/177; 418/206
[58] Field of Search ................. 418/46, 104, 113, 140, 418/206; 277/3, 15, 16, 27, 58, 59, 65, 81 R, 83, 93 R, 93 S D, 173, 174, 177

[56] References Cited

U.S. PATENT DOCUMENTS

| | | | |
|---|---|---|---|
| 2,742,306 | 4/1956 | Kelso | 277/174 |
| 2,779,532 | 1/1957 | Herschmann | 418/206 |
| 2,971,784 | 2/1961 | Tracy | 277/93 |
| 3,081,095 | 3/1963 | Hamrick | 277/3 |
| 3,467,396 | 9/1969 | Hershey | 277/65 |
| 4,013,429 | 3/1977 | Sircar et al. | 55/33 |
| 4,199,152 | 4/1980 | Catterfeld | 277/15 |

Primary Examiner—Leonard E. Smith
Attorney, Agent, or Firm—Russell L. Brewer; James C. Simmons; William F. Marsh

[57] ABSTRACT

This invention pertains to a dual seal system for preventing cross-contamination of the bearing compartments from the process cavity, and the process cavity from the bearing compartment, within a Roots blower. The seal system comprises a inner floating seal having a diameter slightly larger than the shaft so that there is a clearance between the shaft and the seal and a face seal embraced at an outer end of the shaft in fixed communication with the shaft and adapted for rotation. A fluid inlet passage is disposed between the floating seal and the face seal, and permits fluid to be introduced to the seals and in the case of the floating seal pass through the clearance space between the floating seal and shaft and then into the Roots blower cavity.

3 Claims, 2 Drawing Sheets

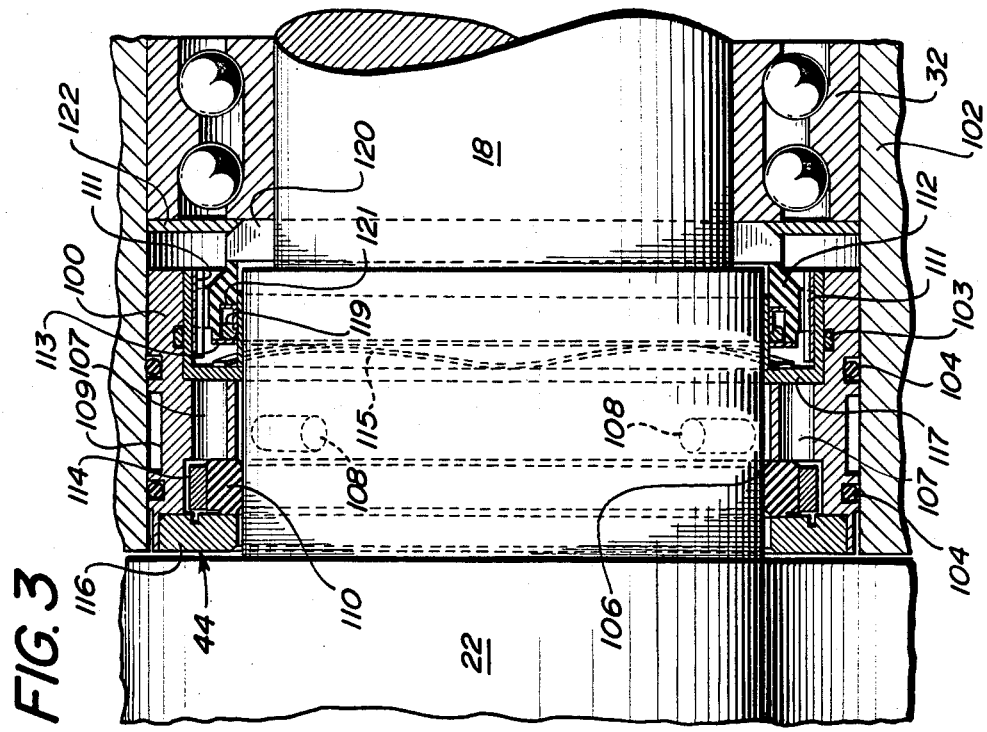
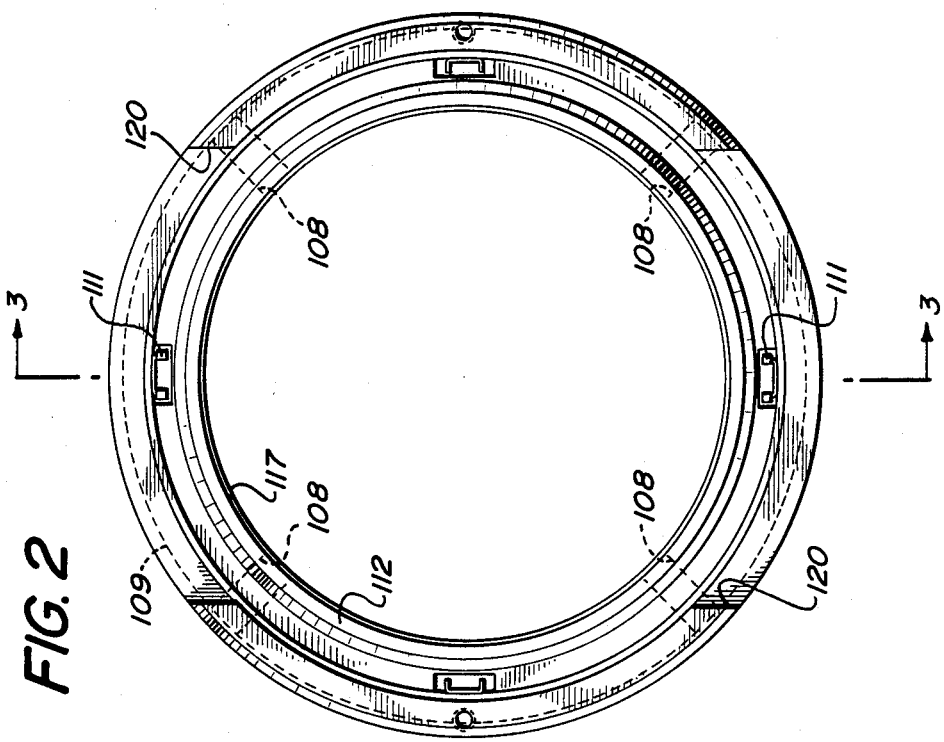

DUAL SEAL SYSTEM FOR ROOTS BLOWER

BACKGROUND OF THE INVENTION

The Roots blower or compressor is widely known and is named after an early patentee of the apparatus (U.S. Pat. No. Re. 2,369). They have been primarily used for moving large quantities of air at low pressures with compression ratios of less than 2.

A Roots blower generally comprises a housing having an inlet and outlet port and walls defining a cavity therein. The cavity is enclosed and shafts inserted therein for carrying lobed impellers between the inlet and outlet ports and caused to rotate in opposite directions within the cavity. The rotation of the impellers is synchronized, by the utilization of timing gears, so that a predetermined clearance is continually maintained between the impellers as they rotate into and out of register with each other. Gas is introduced through an inlet port, pulled into the chamber by the motion of the impellers, then compressed within the cavity and exhausted to an outlet port.

One application for a Roots blower has been in a vacuum swing adsorption process for the separation of nitrogen from air as illustrated in U.S. Pat. No. 4,013,429 which is incorporated by reference. In this type of process, air is passed serially through a pretreatment adsorbent bed for removing moisture and carbon dioxide and then through a main nitrogen adsorbent bed. Once the main bed is fully adsorbed, the nitrogen is desorbed by suction established by the Roots blower and then the bed rinsed with a high purity nitrogen. In the vacuum swing system for obtaining a high purity nitrogen product and an oxygen-enriched gas fraction, the Roots blower is subjected to wide pressure oscillations within very short periods of time. Typically, the pressure range within the vacuum swing adsorption system ranges from 1 to 2 pounds psig to a vacuum of 10 to 50 Torr. The beds are cycled from high pressure to low pressure generally from every 2 to 8 minutes.

Two problems were presented with respect to the Roots blower by the process conditions imposed in the vacuum swing process for the recovery of nitrogen from air. First, dust which resulted from attrition or comminution of the zeolite in the adsorbent bed would migrate into the cavity of the Roots blower during desorption of the bed. This dust would remain in the cavity and then on recompression of the bed the dust in the cavity often would be forced into the bearing compartment by virture of the pressure differential between the cavity and bearing compartment. The dust when combined with lubricant then would cause extreme wear and early failure of the bearings. Second, lubricant, in time, would migrate from the bearing compartment into the cavity and contaminate product gas. The migration of the lubricant occurred during desorption and resulted because of the pressure differential between the bearing compartment and blower cavity. Once lubricant was in the cavity it was then exhausted with product gas or into the zeolite bed.

Numerous attempts were made to solve the sealing problem in the Roots blowers. One technique was to pull a vacuum on the bearing compartment to a level below any pressure that might exist in the cavity. Although the process was effective for preventing lubricant migration into the cavity dust contamination appeared in the seal rings and the bearings were rapidly destroyed. Another technique for effecting a seal was to utilize a multiple series of mechanical seals and purge; e.g., a plurality of seal rings with a nitrogen purge between the inner and outer set of the sealing rings. However, problems were experienced with this particular system in that it resulted in large losses of product nitrogen or the seals were difficult to fabricate.

SUMMARY OF THE INVENTION

The invention pertains to an improvement in the lubricant sealing means for a Roots blower comprising:

a housing having an inlet and outlet port and walls defining a cavity therein;

closure plates secured at the ends of the housing for enclosing said cavity;

a pair of parallel shafts having cylindrical end portions extending transversely between said inlet and said outlet port and extending through said closure plates;

a bearing compartment at an end of said cylindrical end portions of said parallel shafts and external to said cavity and adjacent to said closure plates;

bearings disposed within each bearing compartment and embracing said cylindrical end portions for permitting rotation of the shaft therein;

lubricating means for said bearings while in said bearing compartment;

sealing means between the cavity and bearing compartment for preventing leakage of contaminants into and out of said compartment; and lobed impellers disposed within said cavity and mounted on said shaft in coacting relationship with each other and the walls of the cavity whereby in operation a gaseous fluid is introduced through the said inlet port, trapped and compressed between adjacent lobes of each impeller and the walls of the cavity and then exhausted at some higher pressure through said outlet port.

The improvement in the Roots blower resides within the sealing means which comprises in combination:

(a) a seal housing disposed between said bearings and said closure plate;

(b) a floating seal disposed within said housing and embracing said cylindrical end portions of said shaft proximate said closure plate said floating seal having a diameter slightly larger than said shaft thereby providing a circumferential clearance space between it and said shaft;

(c) a face seal disposed within said seal housing and embracing a cylindrical end portion of said shaft, said face seal proximate said bearing and adapted for rotation with said shaft;

(d) a fluid inlet passage disposed within said seal housing and in communication with said floating seal and said face seal, said passage permitting continuous flow of gas through said clearance space between said floating seal and said shaft and into said cavity and continuous flow to said face seal;

(e) a mating surface disposed about said shaft and proximate said face seal, said mating surface designed for sealing contact with said face seal, and adapted for rotation relative to said face seal, and (f) means for urging said face seal and said mating surface toward each other to provide sealing contact therewith.

There are several advantages associated with the dual seal system described herein for the Roots blower. They are:

the sealing system provides outstanding sealing capability in rigorous process system environments; it minimizes the amount of dust from adsorbent attrition which carries over into the bearing compartment;

it minimizes lubricant carryover from the bearing compartment into the process cavity;

it has outstanding life; and it provides for acceptable process gas losses through loss to the outer face seal or through the floating seal.

DRAWINGS

FIG. 2 is a view in cross-section of the dual seal with gas purge inlet along the plane 2—2 in FIG. 1.

FIG. 3 is a view in cross-section of the seal along the plane 3—3 as shown in FIG. 2, including a sleeve bearing components.

DESCRIPTION OF THE INVENTION

Figure 1:
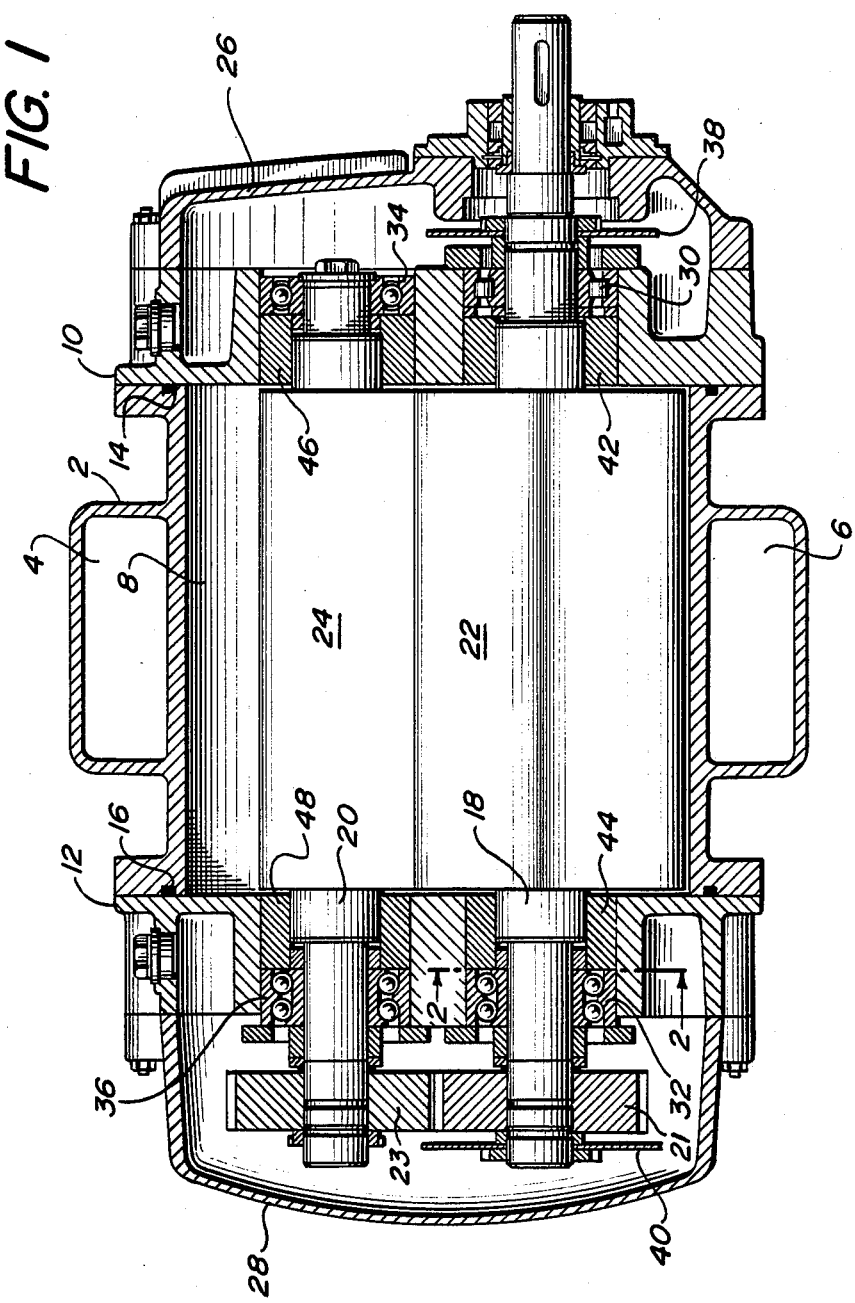
FIG. 1 is a view in cross-section of Roots blower showing the shaft and bearing compartments.

To facilitate understanding of the invention, reference is made to FIG. 1.

Although there are design variations in Roots blowers, a typical Roots blower will comprise a housing 2 having an inlet port 4 and an outlet port 6 with the walls of the housing defining a cavity 8 within the housing. The cavity is enclosed with closure plates 10 and 12. Each closure plate has a pin which helps to align the end closure plates with housing 2 and each contains O-rings 14 and 16 to aid in sealing cavity 8. The Roots blower contains a drive shaft 18 and a timing shaft 20 which extends transversely through the cavity within housing 2 between the inlet port 4, outlet port 6, and closure plates 10 and 12. Drive shaft 18 is driven by a motor (not shown) and causes the rotation of timing shaft 20 through a set of timing gears 21 and 23. Each shaft carries a lobed impeller with impeller 22 being on shaft 18 and impeller 24 on shaft 20, respectively.

A bearing compartment 26 and bearing compartment 28 are disposed at each end of housing 2 and adjacent closure plates 10 and 12 and bolted to provide a sealed enclosure. Bearings 30, 32, 34 and 36 are disposed with the enclosure provided by bearing compartments 26 and 28 and embrace a circular end portion of drive shaft 18 and timing shaft 20 for permitting rotation therein. The bearings are lubricated by means of an oil slinger 40 mounted on the drive shaft. The oil slinger creates a lubricant atmosphere which then permits the passage of oil through interconnecting passageways to the bearings and effect lubrication thereof.

Seals 42 and 44 are located at each end of cavity 8 on drive shaft 18 and within a cavity in closure plates 10 and 12. The purpose of these seals is to prevent product gas from entering bearing compartments 26 and 28, respectively when cavity 8 is at its highest pressure and prevent lubricant from leaving bearing compartments 26 and 28, respectively, and discharging into cavity 8 when cavity 8 is at its lowest pressure. Likewise, seals 46 and 48 are disposed for sealing bearing compartments 26 and 28 from cavity 8 vis-a-vis timing shaft 20. These seals are located exterior to cavity 8 and interior vis-a-vis cavity 8, and the bearings.

FIGS. 2 and 3 represent a view in cross-section, with FIG. 2 being taken as a cross-sectional view along the plane 2—2 in FIG. 1 and FIG. 3 is a view in cross-section of the seal as viewed along the plane 3—3. In addition to aid in understanding the assembly of the seal system, drive shaft 18, sleeve 106 and bearing 32, are included for reference purposes in FIG. 3.

The sealing system of this invention is carried within a seal housing or cartridge 100, which has an external diameter sufficient for an interference fit within seal cavity 102, in closure plate 12. Two O-rings 104 are disposed about the circumference of seal housing 100 to enhance sealing of the interference fit in seal cavity 102 between cavity 8 and bearing compartment 26.

The dual seal system is carried within seal housing 100 and comprises a floating seal 110 which is located at an end portion of seal housing 100 and a face seal 112 which is located at the other end portion of seal housing 100. A plurality of purge gas inlets are located intermediate, floating seal 110 and tape seal 112. Floating seal 110 then is proximate cavity 8 while face seal 112 is proximate bearing 32. The floating seal 110 is carried within a recessed area of seal housing 100 and has an internal diameter slightly larger than the exterior diameter of sleeve 106 which has been press fitted over the drive shaft. Since, the floating seal 110 has a diameter slightly larger than the sleeve it float within seal housing 100 because of dynamic forces generated when shaft 18 is rotated and permits the passage of purge gas into cavity 8.

The floating seal typically is made of conventional sealing material. The seal in the embodiment is highly fragile, and accordingly a floating ring retainer 114 is provided to give structural integrity to floating seal 110. An interior mating ring 116 is located between closure plate 12 and seal housing 100 to effect retainment of floating seal 110 within the seal housing and keep it from migrating axially with respect to the shaft.

The second portion of the dual sealing system comprises a face seal 112 which is carried within a recessed section in seal housing 100. To facilitate installation, the face seal and components thereof are incorporated into an insert 117 which is sealed to recessed section via O-ring 103, Within insert 117, there are four spacers 111 which prevent rotation of face seal 112 with seal housing 100; a spring 115 to urge face seal outwardly toward an exterior mating ring having a contact surface, an angle retainer 113 to prevent inward movement, an O-ring 119 to effect a seal between the face seal 112 and the interior of insert 117 and brake 121.

An exterior mating ring 120 is disposed proximate said face seal and the bearing and is placed against face seal 112 to hold it in place and prevent axial movement. Exterior mating ring 120 is pinned to sleeve 106 so that it will rotate with the shaft and is locked into position by snap ring 122. Snap ring 122 also prevents movement of bearing 32 from moving inwardly. A contact surface for exterior mating ring 120 is selected such that it provides sealing contact with face seal 112. Generally, this surface is constructed from a hard material and is selected so that it will have the least wear while maintaining frictional and sealing contact with the surface of face seal 112. Face seal 112, on the other hand is made of a material that will permit preferential wear.

A purge gas, which is generally product gas, is continuously injected through purge gas inlets 108 and is caused to flow through an interconnecting passageway to floating seal 110. Because of the clearance space between sleeve 106 and floating seal 110, the gas then is caused to exit into cavity 8 during pressurization or evacuation of cavity 8. Accordingly it can be appreciated that the clearance space between shaft 106 and floating seal 110 should be kept to a minimum in order to minimize purge gas flow into the cavity 8 since the gas is lost to product and must be recompressed. Another portion of the purge gas is caused to flow through the clearance space between sleeve 106 and seal housing 100 to face seal 112. This gas provides cooling to the sealing surfaces which are in frictional contact and thereby reduces wear of the sealing surfaces on face seal 112 and exterior mating ring 120. Under ideal conditions, there would be no leakage of gas into the bearing compartment, but since conditions are not ideal there is some leakage. However, since the source of purge gas is dust free, the chance of dust from the zeolite bed penetrating the bearing compartment is nil. This is because the seal and purge gas flow which is opposite gas flow from cavity 8 to the bearing compartment prevents lubricant from flowing into the seal compartment and ultimately into cavity 8.

One of the preferred embodiments of the invention which enables easy installation of the seal system and accessories is the combination of a telescoped shaft, the sleeve, the seal housing or cartridge for the dual seal. One technique for effecting installation of the bearing seal system is to install sleeve 106 over drive shaft 18 by pressing the sleeve onto the shaft. Then, the dual seal system which includes, floating seal 112 and face seal 110 is assembled into a single unit within seal housing or cartridge 100, and pressed into the cavity as defined by seal cavity 102 in enclosure plate 10. Then the exterior mating ring 120 is wedged onto the shaft for contact with face seal 112 and held in place by snap ring 122. Last, the bearing cartridge is inserted over drive shaft 18, which is then held in place by another series of retaining surfaces.

A series of runs were carried out for separating nitrogen from air using the system as described in U.S. Pat. No. 4,013,429 for the separation of nitrogen from air. The Roots blower was exposed to pressure ranges from 1-2 psig to vacuum of 10-50 Torr within the process cavity every two to five minutes. A variety of mechanical seals were used within the system including the present dual seal system. Only the dual seal system had a seal life greater than about 5,000 hours. Ring seals failed quite early due to erosion; their life was generally less than 100 hours.

What is claimed is:

1. In a Roots blower comprising:

a housing having an inlet and outlet port and walls defining a cavity therein;

closure plates secured at the ends of the housing for enclosing said cavity;

a pair of parallel shafts having cylindrical portions extending transversely between said inlet and said outlet port and extending through said closure plates;

a bearing compartment embracing said cylindrical portions of said parallel shafts and external to said cavity and adjacent to said closure plates;

bearings disposed within each bearing compartment and embracing said cylindrical portions for permitting rotation of the shaft therein;

lubricating means for said bearings while in said bearing compartment;

sealing means between the cavity and bearing compartment for preventing leakage of contaminants into and out of said compartment; and lobed impellers disposed within said cavity and mounted on said shaft in coacting relationship with each other and the walls of the cavity wherein in operation a gaseous fluid is introduced through the said inlet port, trapped and compressed between adjacent lobes of each impeller and the walls of the cavity and then exhausted at some higher pressure through said outlet port, the improvement residing within said sealing means which comprises in combination:

(a) a seal housing disposed between said bearings and said closure plate;

(b) a floating seal disposed within said seal housing and embracing a cylindrical portion of said shaft proximate said closure plate, said floating seal having a diameter slightly larger than said shaft thereby providing a circumferential clearance space between it and said shaft;

(c) a face seal disposed within said seal housing and embracing a cylindrical portion of said shaft, said face seal proximate said bearing;

(d) a fluid inlet passage disposed within said seal housing and in communication with said floating seal and said face seal, said passage permitting continuous flow of gas through said clearance space between said floating seal and said shaft and into said cavity and flow to said face seal;

(e) an exterior mating ring disposed about said shaft and proximate said face seal, said exterior mating ring having a contact surface designed for seal contact with said face seal, and adapted for rotation relative to said face seal, and (f) means for urging said face seal and said external mating ring toward each other to provide sealing contact therewith.

2. The Roots Blower of claim 1 wherein said face seal is urged outwardly from said seal housing and toward said exterior mating ring.

3. The Roots blower of claim 2 wherein said external mating ring is in fixed contact with said shaft and thereby rotates with said shaft.

* * * * *